United States Patent
Andrianov et al.

(10) Patent No.: US 11,018,944 B2
(45) Date of Patent: May 25, 2021

(54) METHOD AND APPARATUS FOR VIRTUALIZED NETWORK FUNCTION SCALING THAT IS INITIATED BY NETWORK MANAGEMENT AND/OR ELEMENT MANAGEMENT

(71) Applicant: NOKIA SOLUTIONS AND NETWORKS OY, Espoo (FI)

(72) Inventors: Anatoly Andrianov, Schaumburg, IL (US); Yi Zhi Yao, Beijing (CN); Gyula Bodog, Budapest (HU)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 313 days.

(21) Appl. No.: 15/752,698

(22) PCT Filed: Jul. 28, 2016

(86) PCT No.: PCT/EP2016/068065
§ 371 (c)(1),
(2) Date: Feb. 14, 2018

(87) PCT Pub. No.: WO2017/029097
PCT Pub. Date: Feb. 23, 2017

(65) Prior Publication Data
US 2018/0241630 A1 Aug. 23, 2018

Related U.S. Application Data

(60) Provisional application No. 62/205,204, filed on Aug. 14, 2015.

(51) Int. Cl.
*H04L 12/24* (2006.01)
*H04L 29/08* (2006.01)
(Continued)

(52) U.S. Cl.
CPC ...... *H04L 41/0896* (2013.01); *G06F 9/45558* (2013.01); *G06F 9/5077* (2013.01);
(Continued)

(58) Field of Classification Search
None
See application file for complete search history.

(56) References Cited

U.S. PATENT DOCUMENTS 9,647,889 B1 * 5/2017 Jones ................ G06F 9/547
2004/0054648 A1 3/2004 Mogi et al.
(Continued)

OTHER PUBLICATIONS

3GPP TR 32.842 V1.2.1 (Aug. 2015); 3rd Generation Partnership Project; Technical Specification Group Services and System Aspects; Telecommunication management; Study on network management of virtualized networks (Release 13).
(Continued)

*Primary Examiner* — Angela Nguyen
(74) *Attorney, Agent, or Firm* — Squire Patton Boggs (US) LLP

(57) ABSTRACT

A method and apparatus may include transmitting a scaling request. The scaling request comprises a request for virtualized network function expansion or virtualized network function contraction. The scaling request is transmitted to a second network node. A first domain is directed to application level details. A second domain is directed to virtualization level details. The scaling request comprises: (1) a relative target capacity that is generic to both the first domain and the second domain, (2) an absolute target capacity that is specific to the first domain, or (3) a relative target capacity that is specific to virtualized network function level targets. The method may also include receiving a notification that a virtualization network function has been updated based on the transmitted scaling request.

20 Claims, 7 Drawing Sheets

(51) Int. Cl.
    *G06F 9/455*      (2018.01)
    *G06F 9/50*       (2006.01)
(52) U.S. Cl.
    CPC ...... *H04L 41/0806* (2013.01); *H04L 41/0816* (2013.01); *G06F 2009/45595* (2013.01); *H04L 67/10* (2013.01)

(56) References Cited

U.S. PATENT DOCUMENTS

2014/0201374 A1   7/2014   Ashwood-Smith et al.
2014/0317261 A1  10/2014   Shatzkamer et al.

OTHER PUBLICATIONS

ETSI GS NFV-MAN 001 V1.1.1 (Dec. 2014); Network Functions Virtualisation (NFV); Management and Orchestration.
International Search Report & Written Opinion dated Nov. 4, 2016 corresponding to International Patent Application No. PCT/EP2016/068065.
European Office Action issued in corresponding European Patent Application No. 16 747 881.7-12 13 dated Jan. 28, 2021.

* cited by examiner

METHOD AND APPARATUS FOR VIRTUALIZED NETWORK FUNCTION SCALING THAT IS INITIATED BY NETWORK MANAGEMENT AND/OR ELEMENT MANAGEMENT

BACKGROUND

Field

Embodiments of the present invention relate to virtualized network function scaling that is initiated by network management and/or element management.

Description of the Related Art

In the Network Functions Virtualization (NFV) framework, virtualized network functions may be software implementations of network functionality that are implemented on a NFV infrastructure. The NFV infrastructure may include hardware and software components. In the NFV framework, network functions virtualization management and an orchestration architectural framework may include, at least, functional blocks, data records utilized by these functional blocks, and interfaces that are used by the functional blocks to communicate data.

SUMMARY

According to a first embodiment, a method may include transmitting, by a first network node, a scaling request. The scaling request includes a request for virtualized network function expansion or virtualized network function contraction. The scaling request is transmitted to a second network node. A first domain is directed to application level details. A second domain is directed to virtualization level details. The scaling request includes: (1) a relative target capacity that is generic to both the first domain and the second domain, (2) an absolute target capacity that is specific to the first domain, or (3) a relative target capacity that is specific to virtualized network function level targets. The method may also include receiving a notification that a virtualization network function has been updated based on the transmitted scaling request.

In the method of the first embodiment, the first network node includes a network management entity. The network management entity initiates the scaling request. If the scaling request comprises a relative target capacity that is generic to both the first domain and the second domain, then the scaling request is transmitted along a first path from the network management entity, to a network functions virtualization orchestrator, to a virtualized network function manager. If the scaling request comprises an absolute target capacity that is specific to the first domain, then the scaling request is transmitted along a second path towards element management for translating into a relative target capacity. If the scaling request comprises a relative target capacity that is specific to virtualized network function level targets, then the scaling request is transmitted along the second path towards the element management for translating into a relative target capacity that is specific to virtualized network function components.

In the method of the first embodiment, the first network node includes an element management entity. The second network node includes at least one of the network functions virtualization orchestrator and the virtualized network function manager.

In the method of the first embodiment, transmitting the scaling request along the second path comprises transmitting the scaling request from the network management entity, to the network functions virtualization orchestrator, to the virtual network function manager, to the element management, and back to the virtual network function manager.

In the method of the first embodiment, the relative target capacity is expressed relative to a current capacity.

According to a second embodiment, an apparatus may include at least one processor. The apparatus may also include at least one memory including computer program code. The at least one memory and the computer program code may be configured, with the at least one processor, to cause the apparatus at least to transmit a scaling request. The scaling request may include a request for virtualized network function expansion or virtualized network function contraction. The scaling request is transmitted to a network node. A first domain is directed to application level details. A second domain is directed to virtualization level details. The scaling request comprises: (1) a relative target capacity that is generic to both the first domain and the second domain, (2) an absolute target capacity that is specific to the first domain, or (3) a relative target capacity that is specific to virtualized network function level targets. The apparatus may also be caused to receive a notification that a virtualization network function has been updated based on the transmitted scaling request.

In the apparatus of the second embodiment, the apparatus may include a network management entity. The network management entity may initiate the scaling request. If the scaling request comprises a relative target capacity that is generic to both the first domain and the second domain, then the scaling request is transmitted along a first path from the network management entity, to a network functions virtualization orchestrator, to a virtualized network function manager. If the scaling request comprises an absolute target capacity that is specific to the first domain, then the scaling request is transmitted along a second path towards element management for translating into a relative target capacity. If the scaling request comprises a relative target capacity that is specific to virtualized network function level targets, then the scaling request is transmitted along the second path towards the element management for translating into a relative target capacity that is specific to virtualized network function components.

In the apparatus of the second embodiment, the apparatus may include an element management entity. The network node may include at least one of the network functions virtualization orchestrator and the virtualized network function manager.

In the apparatus of the second embodiment, transmitting the scaling request along the second path comprises transmitting the scaling request from the network management entity, to the network functions virtualization orchestrator, to the virtual network function manager, to the element management, and back to the virtual network function manager.

In the apparatus of the second embodiment, the relative target capacity is expressed relative to a current capacity.

According to a third embodiment, a computer program product may be embodied on a non-transitory computer readable medium. The computer program product may be configured to control a processor to perform a method according to the first embodiment.

According to a fourth embodiment, a method may include receiving, by a second network node, a scaling request. The scaling request may include a request for virtualized network function expansion or virtualized network function contraction. The scaling request is received from a first network node. A first domain is directed to application level details. A second domain is directed to virtualization level details. The scaling request may include: (1) a relative target capacity that is generic to both the first domain and the second domain, (2) an absolute target capacity that is specific to the first domain, or (3) a relative target capacity that is specific to virtualized network function level targets. The method may also include calculating a target amount of virtual resources to allocate. The method may also include performing allocation of the target amount of virtual resources.

In the method of the fourth embodiment, the second network node may include a network functions virtualization orchestrator. The first network node may include at least one of a network management entity and an element management entity.

In the method of the fourth embodiment, the second network node may include a virtualized network function manager. The first network node may include at least one of a network management entity and an element management entity.

In the method of the fourth embodiment, the relative target capacity is expressed relative to a current capacity.

According to a fifth embodiment, an apparatus may include at least one processor. The apparatus may also include at least one memory including computer program code. The at least one memory and the computer program code may be configured, with the at least one processor, to cause the apparatus at least to receive a scaling request. The scaling request includes a request for virtualized network function expansion or virtualized network function contraction. The scaling request is received from a network node. A first domain is directed to application level details. A second domain is directed to virtualization level details. The scaling request may include: (1) a relative target capacity that is generic to both the first domain and the second domain, (2) an absolute target capacity that is specific to the first domain, or (3) a relative target capacity that is specific to virtualized network function level targets. The apparatus may also be caused to calculate a target amount of virtual resources to allocate. The apparatus may also be caused to perform allocation of the target amount of virtual resources.

In the apparatus of the fifth embodiment, the apparatus may include a network functions virtualization orchestrator. The network node may include at least one of a network management entity and an element management entity.

In the apparatus of the fifth embodiment, the apparatus may include a virtualized network function manager. The network node may include at least one of a network management entity and an element management entity.

In the apparatus of the fifth embodiment, the relative target capacity is expressed relative to a current capacity.

According to a sixth embodiment, a computer program product may be embodied on a non-transitory computer readable medium. The computer program product may be configured to control a processor to perform a method according to the fourth embodiment.

BRIEF DESCRIPTION OF THE DRAWINGS

For proper understanding of the invention, reference should be made to the accompanying drawings, wherein.

DETAILED DESCRIPTION

Figure 1:
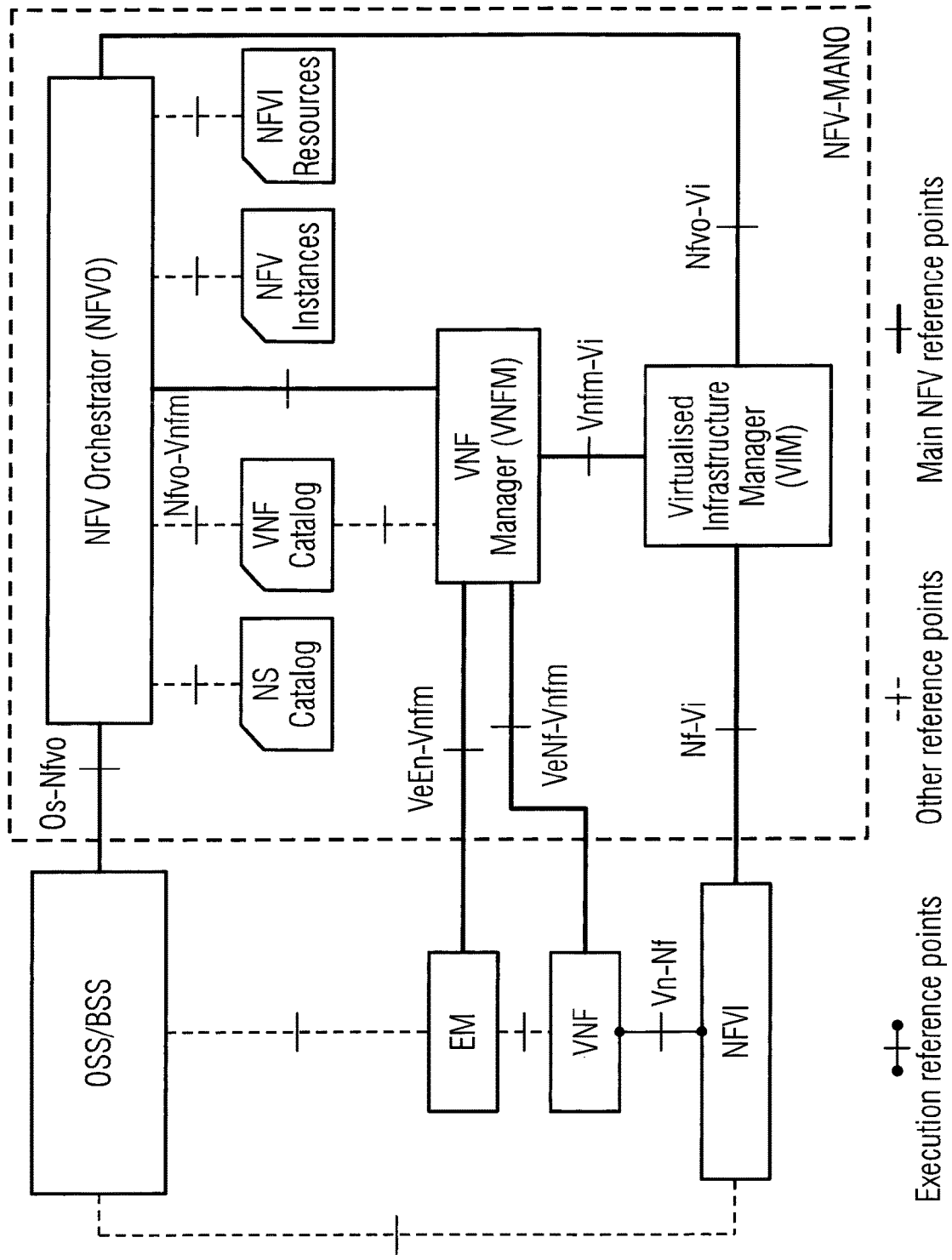
FIG. 1 illustrates an example Network Functions Virtualization (NFV) Management and Orchestration (MANO) architectural framework, in accordance with certain embodiments.

Certain embodiments of the present invention provide a method for triggering/initiating scaling operations in a Network Functions Virtualization (NFV) environment. FIG. 1 illustrates an example NFV MANO architectural framework, in accordance with certain embodiments.

In the NFV environment, several functional entities (such as a Network Management (NM) entity, an Element Management (EM) entity, a Network Functions Virtualization Orchestrator (NFVO) entity, and/or a VNF Manager (VNFM) entity) can initiate a VNF scaling operation (see 3GPP Technical Report 32.842 and European Telecommunications Standards Institute (ETSI) NFV MANO Group Specification). When either NM or EM initiates the VNF scaling operation (such as an expansion or contraction operation), the scaling request is sent to NFVO/VNFM. The request may be sent to NFVO/NNFM via "horizontal" reference points Os-Ma-nfvo or Ve-Vnfm, for example. ETSI Industry Specification Groups NFV refers to a connection between any two functional blocks (FBs) as a "reference point." For the functional blocks depicted within NFV MANO architectural framework (illustrated by FIG. 1), each identified reference point may be uniquely named. The "Os-Ma-nfvo" and "Ve-Vnfm" are names of the corresponding reference points (first, a reference point between OSS and NFVO, and, second, a reference point between EM/VNF and VNFM). Such reference points may be considered "horizontal," as the connection lines of the MANO architectural framework diagram are represented as horizontal lines.

The expansion or contraction operation is intended to be performed in order to achieve a desired target capacity. The desired target capacity of the VNF may be indicated in some way so that the NFVO/VNFM may determine/calculate the amount of target (virtual) resource to allocate to the VNF.

The NM/EM is generally unaware of the amount of (virtualized) resources that is necessary to be allocated in accordance with the target capacity of the VNF. Virtualized resources are utilized to implement the concept of virtualization. Typically, virtualized resources may correspond to "computing" resources (such as a virtualized computer processing unit (CPU) and/or a virtualized memory, for example), "storage" resources, and "network" resources, for example. An application that runs in a virtualized environment does not "see" the actual physical resources (as these physical resources may be hidden by a virtualization layer). A scale-up/scale-down operation may cause the virtualization layer to change the amount of virtualized resources that are allocated. MANO FBs may allocate different amount of virtualized resources to the VNF and may change the allocation over time (e.g., the allocation may be changed based on requests or internal decisions). The NM/EM generally only provides an indication of the target capacity in application terms. The NFVONNFM determines/calculates the amount of target (virtualized) resource to allocate to the VNF, when the scaling operation is executed. If an absolute target capacity is expressed in application terms by the NM/EM to the NFVO/VNFM, the NFVONNFM is generally unable to determine an amount of target (virtualized) resources to allocate to achieve the target capacity.

In view of the above, a conversion mechanism may be needed when conveying the desired target capacity (which is expressed in application terms by the NM/EM) to the NFVONNFM. After conversion, the desired target capacity is to be conveyed to the NFVONNFM in (virtualized) resource terms.

In view of the above, certain embodiments of the present invention may enable a target capacity indication to be effectively communicated from the NM/EM to the NFVO/VNFM, in order to enable NM/EM-initiated VNF scaling operations.

With one embodiment, the NM/EM provides a relative target capacity in a VNF scaling request to NFVONNFM. For example, the relative target capacity can be expressed relative to a current capacity, as described in more detail below. The scaling request may be initiated by the NM. The NM can initiate the VNF scaling request (such as a request for expansion or contraction) directly to the NFVO. This scenario corresponds to an NM to NFVO scenario.

Alternatively, the NM can initiate the VNF scaling request to EM, and the EM may then forward the request to VNFM. This scenario corresponds to an NM to EM to VNFM scenario.

Figure 2:
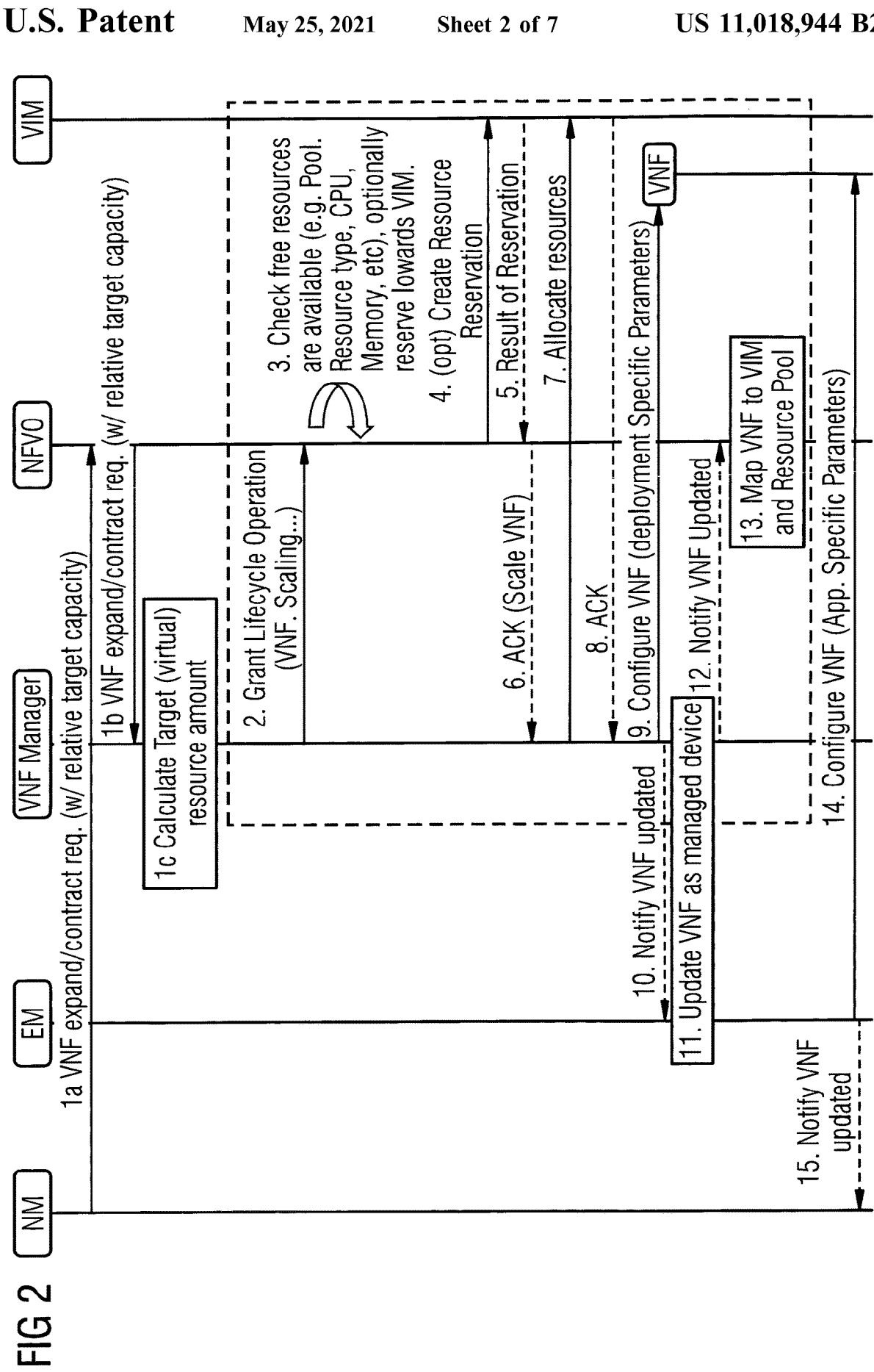
FIG. 2 illustrates a Network Management (NM) that initiates a Virtualized Network Function (VNF) expansion/contraction request, and transmits the request to Network Functions Virtualization Orchestration (NFVO), in accordance with certain embodiments.

FIG. 2 illustrates a NM that initiates a VNF expansion/contraction request, and transmits the request to NFVO, in accordance with certain embodiments. The resources to be allocated for the expansion request may then be allocated by the VNFM.

With regard to the NM to NFVO scenario, the NM provides a desired relative target capacity of the VNF, where the relative target capacity is expressed (in the scaling request to the NFVO) by using a current capacity as a reference (see flow 1a in FIG. 2). For example, the target capacity could be expressed as "1.5 times of the current capacity" (for an expansion scaling operation), or as "0.7 times of the current capacity" (for a contraction scaling operation).

The NFVO may forward the request to VNFM (see flow 1b in FIG. 2). The VNFM may then determine/calculate the target (virtual) resource allocation amount that is necessary, based on the relative target capacity and a Virtual Network Function Descriptor (VNFD) (see flow 1c in FIG. 2).

For example, if the relative desired target capacity of a virtualized mobility management entity (vMME) is "1.5 times of the current capacity," the VNFM may need to calculate/determine the additional amount of virtual resources that are needed by the VNFC instances of the vMME, in order to support the "1.5 times capacity." VNFD may be metadata associated with a particular VNF by a provider (vendor). The content and format of the VNFD may be currently standardized by ETSI NFV Interfaces and Architecture workgroup. With certain embodiments, the VNFD may be available at NFVO, VNFM, and OSS/NM. The EM is typically provided by the same vendor as VNF. Therefore, the content of VNFD may be known by the EM.

This calculation/determination may be performed by the VNFM, based on information in the VNFD (such as information from, for example, a mapping table or a formula). In the event that such information is not available in the VNFD, the calculation/determination may then be based on internal logic (for example, information as learned from observing VNF behavior).

Additionally, the VNFM may also need to determine whether there are any dependencies upon other virtual network function components' (VNFCs') resources allocation, and if the other VNFCs need to be expanded with more virtual resources. The VNFM may determine if other VNFCs need to be expanded with more virtual resources based on a deployment flavor, a virtual resource description, a VNF description, and/or a VNFC description in the VNFD. The VNFM may be a functional block that is provided by a different vendor as compared to the VNF. Therefore, the VNFM may not have any knowledge about VNF (for example, knowledge regarding an internal architecture, knowledge regarding a performance profile, etc), aside from the knowledge that is exposed by the VNF provider in the VNFD or the knowledge that is learned by the VNFM (while observing external VNF behavior).

Figure 3:
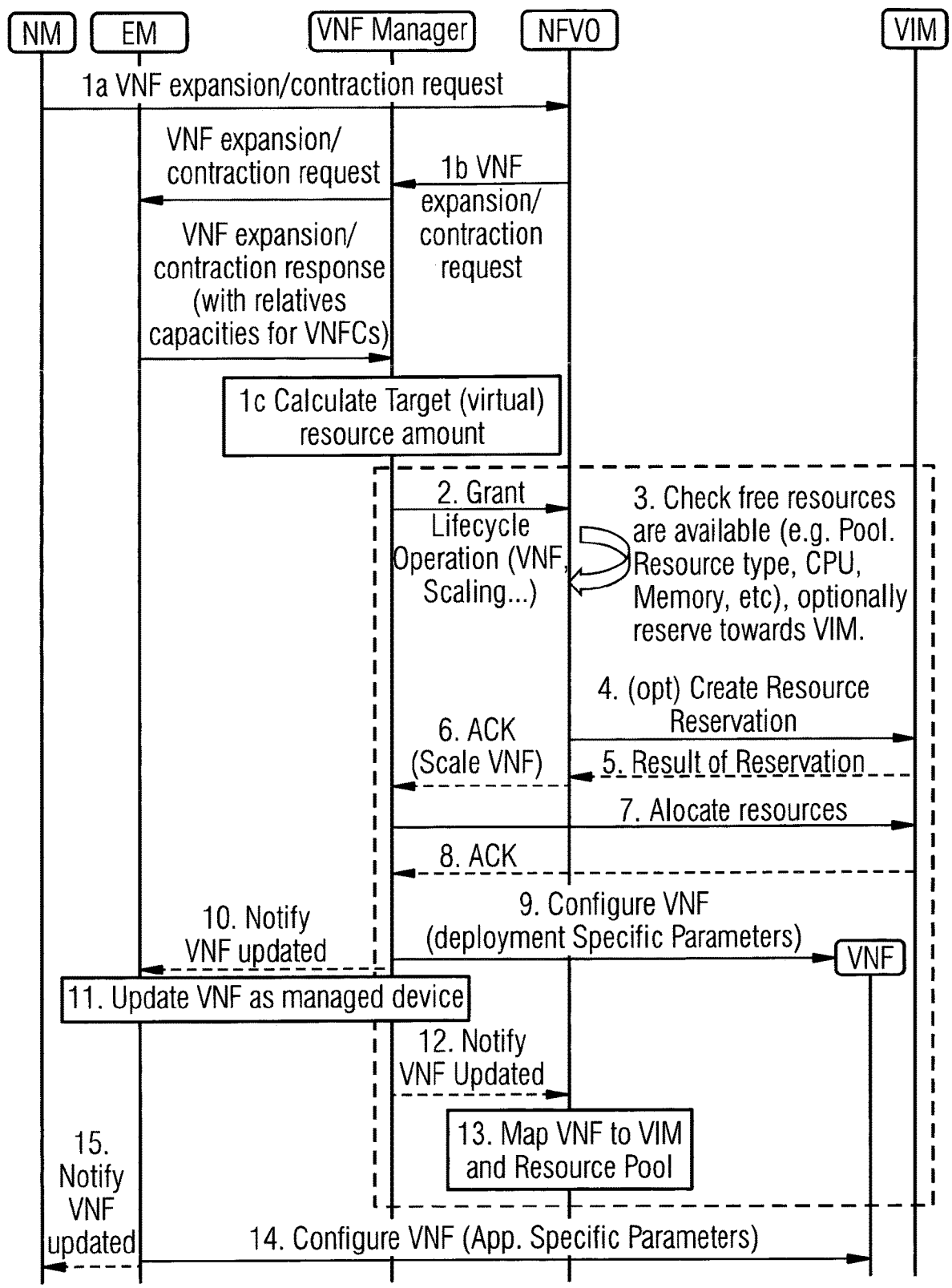
FIG. 3 illustrates another method where an NM initiates a VNF expansion/contraction request to NFVO, in accordance with certain embodiments.

FIG. 3 illustrates another method where the NM initiates a VNF expansion/contraction request to NFVO, in accordance with certain embodiments. The following steps are illustrated in FIG. 3, and the steps are performed for scaling the VNF. In this example, the scaling corresponds to an expanding request.

In the NM to NFVO scenario, the NM may provide either an absolute desired target capacity of the VNF or a relative desired target capacity of the VNF (where the relative desired target capacity is expressed using the current capacity as a reference in the scaling request to NFVO) (See flow 1a in FIG. 3). For example, the absolute target capacity could be expressed as "10000 busy hour call attempts (BHCA)." BHCA is an example of an application-specific metric. However, other embodiments may use other types of metrics. For example, other useable metrics may include, for example, a number of active sessions, a number of registered users, and/or an overall data volume. The utilized metric may be known to (may be interpreted by) the application aware entities (such as VNF, EM, NM). However the utilized metric may be "unknown" to the virtualization aware (MANO) entities. Certain embodiments may illustrate that the application knowledge is not needed in all involved entities, and a clear separation of application management versus virtualization management is possible.

The relative target capacity could be expressed as "1.5 times of the current capacity" (for an expansion scaling operation), or as "0.7 times of the current capacity" (for a contraction scaling operation).

The NFVO may forward the request to VNFM (See flow 1b in FIG. 3). The VNFM may then forward the scaling request (received from NFVO) to the EM for translation. If an absolute target capacity is specified in the scaling request, the EM compares the specified target capacity with the current VNF capacity and translates the absolute target capacity into a relative target capacity. Next, (also, in the event that a relative desired target capacity is specified in the scaling request) the EM translates the per VNF relative target capacity into a per application scaling dimension (per VNFC). For example, the desired target capacity for a specific scaling dimension could be "1.5 times of the current capacity" of a specific VNFC (for expansion), or "0.7 times of the current capacity" of a specific VNFC (for contraction).

With certain embodiments, the VNFM calculates the target (virtual) resource allocation amount based on a relative target capacity and VNFD (See flow 1c in FIG. 3). For example, if the relative desired target capacity of a vMME is "1.5 times of the current capacity," then the VNFM calculates the additional amount of virtual resources that are to be allocated to the VNFC instances of the vMME, in order to support the expansion to "1.5 times capacity." Such a calculation may be performed by the VNFM based on information in the VNFD (such as based on, for example, information expressed by a mapping table or a formula). In the event that such information is not available in the VNFD, the calculation of the needed virtual resources may be based on internal logic (for example, the amount of needed virtual resources may be learned from observing the VNF behavior). Additionally, the VNFM may also need to determine whether there is any dependency upon other VNFCs' resources allocation, and if the other VNFCs need to be expanded with more virtual resources based on a deployment flavor, a virtual resource description, a VNF description, and/or a VNFC description in the VNFD.

Figure 4:
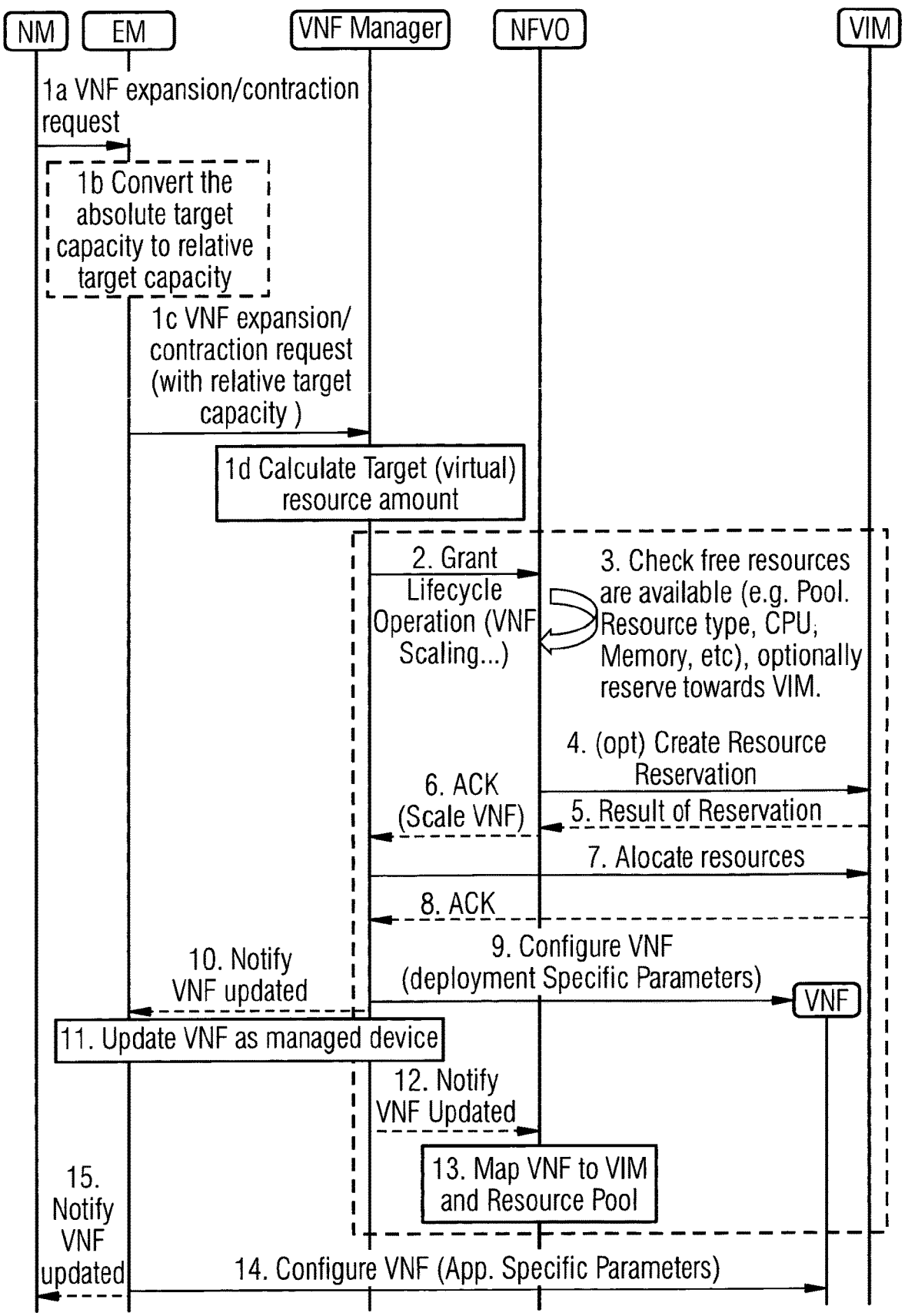
FIG. 4 illustrates a method where an NM initiates a VNF expansion/contraction request to EM, in accordance with certain embodiments.

FIG. 4 illustrates a method where the NM initiates the VNF expansion/contraction request to the EM, in accordance with certain embodiments. The following steps, as illustrated in FIG. 4, are performed for scaling (expanding in this example) the VNF. In the NM to EM to VNFM scenario, the NM provides either a relative desired target capacity (which is expressed relative to the current capacity in the scaling request to the EM (see flow 1a in FIG. 4)), or the NM provides an absolute desired target capacity to the VNF. For example, when the relative desired target capacity method is used, the target capacity could be expressed as "1.5 times of the current capacity" (for expansion), or as "0.7 times of the current capacity" (for contraction). In the scenario where the NM uses the absolute desired target capacity, the NM may express the desired target capacity to the EM in application terms (for example, the NM may express the desired target capacity in terms of target BHCA, sessions, and/or users).

The target capacity could be a total value or a combination of sub-targets, and each sub-target may be a per sub-function of the VNF. For instance, one sub-target may be for the number of subscriber registrations, while the other sub-targets may be for the amount of call/session traffic. A VNF may be complex, with several sub-functions spread across several virtual machines (virtualization containers). Each virtual machine may be a separate VNFC. For example, there may be several "call processors," one or more "load balancer," one or more management components, a database engine, etc. For an overall target capacity of "100000 XYZ" (XYZ may be an application dimension metric such as, for example, BHCA), the vendor may decide that 5 call processors are needed with 20000 XYZ capacity each, one load balancer is needed with 5 way capability, one management component is needed, and/or one database with a size of 1000000 records is needed. The 20000 XYZ, 5 flows, and 1000000 records would be the individual component capacities. When an overall capacity needs to be increased by 20%, the corresponding internals of the VNF may be changed. For example, a number of call processors may be increased from 5 to 6, the load balancers may be increased from 1 (5-way) to 3 (one 2-way and two 3-way), a database capacity may need to be increased, a second management component may be added, etc. The individual per-component targets may be called "sub-targets."

The EM may forward the scaling request with a relative target capacity to VNFM (See flow 1c in FIG. 4). If the NM provided the absolute value, the EM converts the absolute value to a relative value before forwarding the scaling request to VNFM (See flow 1b in FIG. 4).

In case the sub-targets are provided, the EM may also need to map each application sub-target from application sub-function (unknown to the VNFM) to the dimension of the corresponding VNFC. With certain embodiments, only the EM (and the VNF) may know the mapping of application sub-functions (for example, the mapping of a "call processor," a "load balancer," a "database," and/or a "manager") to the VNFCs (virtualization containers/virtual machines). So, if there are two dimensions, such as intensity (for example, in terms of BHCA) and capacity (for example, in terms of users), the EM would know which VNFCs need to be scaled and by what amount. For example, the EM would know whether the scaling should be applied to only call processors, to only databases, or to both.

As described above, the NFVO may forward the request to VNFM (See flow 1b in FIG. 2). The VNFM then calculates the target (virtual) resource allocation amount based on a relative target capacity and VNFD (See flow 1c in FIG. 2).

For example, if the relative desired target capacity of a vMME is "1.5 times of the current capacity," the VNFM then calculates the additional amount of virtual resources that are needed by the VNFC instances of the vMME, in order to support the expansion to "1.5 times capacity." This calculation/determination may be performed by the VNFM based on information in the VNFD (such as based on information from, for example, a mapping table or a formula). In the event that such information is not available in the VNFD, the calculation/determination may then be based on internal logic (for example, as learned from observing the VNF behavior), or with the help of EM.

Additionally, the VNFM may also need to determine whether there is any dependency upon other VNFCs' resources allocation, and if the other VNFCs need to be expanded with more virtual resources. As described above, the VNFM may determine if other VNFCs need to be expanded with more virtual resources based on a deployment flavor, a virtual resource description, a VNF description, and/or a VNFC description in the VNFD.

Figure 5:
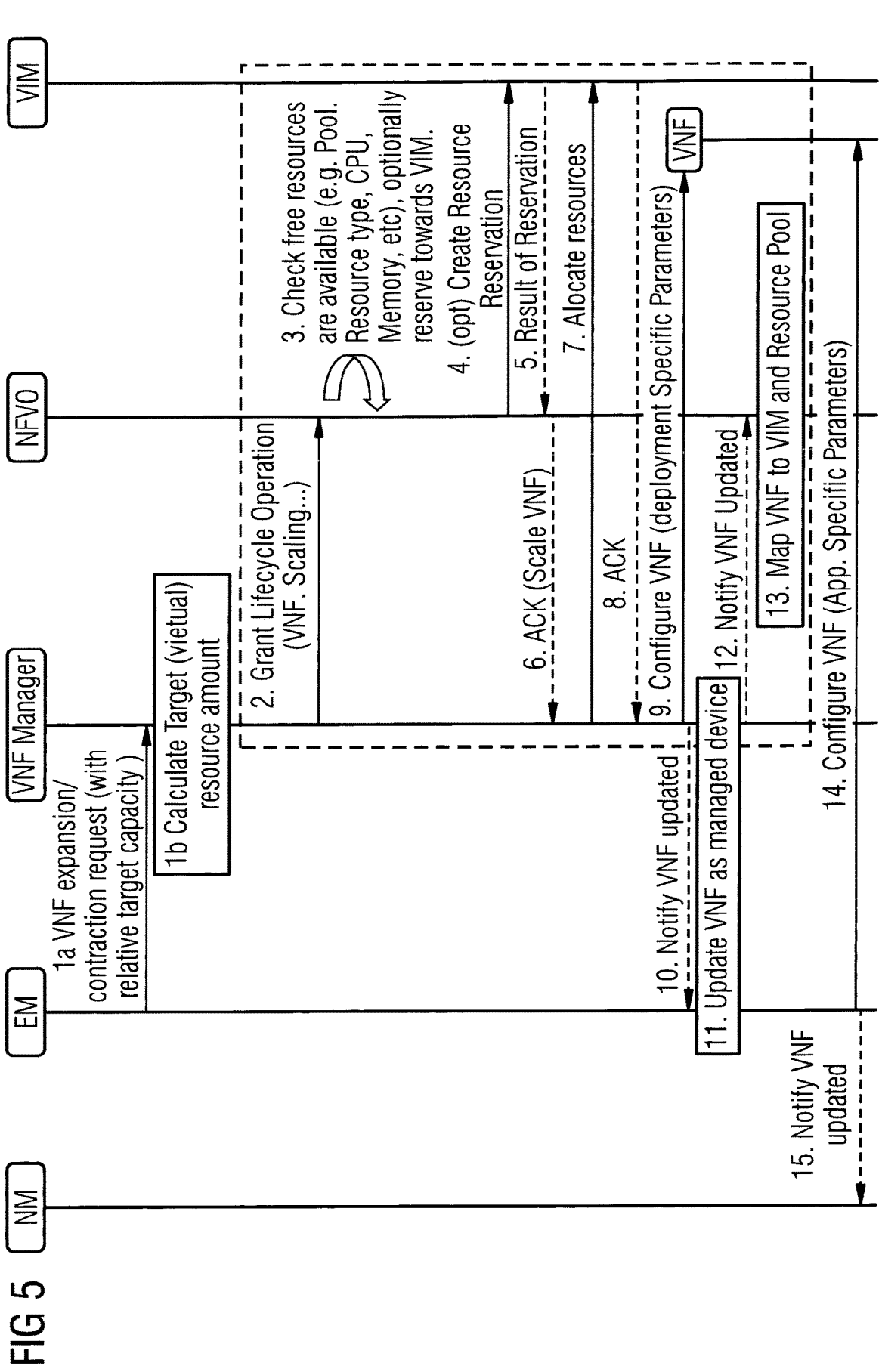
FIG. 5 illustrates a method where an EM initiates a VNF expansion/contraction request, in accordance with certain embodiments.

FIG. 5 illustrates a method where the EM initiates the VNF expansion/contraction request, in accordance with certain embodiments. The following steps, as shown in FIG. 5, are performed for scaling (expanding in this example) the VNF. The EM may initiate scaling requests. In this scenario, the EM provides either: (1) a relative target capacity of the VNF, where the relative target capacity is expressed in the scaling request to VNFM by using a current capacity as a reference (see flow 1a in FIG. 5) for the whole VNF, or (2) a relative target capacity of the VNF per application scaling dimension (as translated to a VNFC). For example, the desired target capacity for a specific scaling dimension could be "1.5 times of the current capacity" of a specific VNFC (for an expansion scaling operation), or "0.7 times of the current capacity" of a specific VNFC (for a contraction scaling operation).

Here, the scaling dimension (in application terms) is being translated into a specific set of VNFCs, which may need to be scaled. For example, if the application level metrics reflect a high number of subscriber registrations, but reflect a smaller amount of call/session traffic, the application level metrics may indicate that VNFCs that handle subscriber registrations may have a need for scaling. The VNFCs that handle subscriber registrations may be the Database (DB) VNFC of the VNF, for example. On the other hand, if session handling is high, the scale operation should request scaling of the session handling VNFC. The knowledge relating to the internal application architecture (which reflects, for example, which VNFCs are responsible for which particular application functionalities) is generally not shared with VNFM, and the knowledge is generally known only to the EM of a same vendor as the VNF.

The NFVO may forward the request to VNFM (see flow 1b in FIG. 2). The VNFM then calculates the target (virtual) resource allocation amount based on the relative target capacity and VNFD (see flow 1c in FIG. 2). For example, if the relative desired target capacity of a vMME is "1.5 times of the current capacity," the VNFM may need to calculate/determine the additional amount of virtual resources that are needed by the VNFC instances of the vMME, in order to support the expansion of "1.5 times capacity." This calculation/determination may be performed by the VNFM based on information in the VNFD (such as based on information from, for example, a mapping table or a formula). In the event that such information is not available in the VFND, the calculation/determination may then be based on internal logic (for example, as learned from observing the VNF behavior).

Additionally, the VNFM may also need to determine whether there is any dependency upon other VNFCs' resources allocation, and if the other VNFCs need to be expanded with more virtual resources. The VNFM may determine if other VNFCs need to be expanded with more virtual resources based on a deployment flavor, a virtual resource description, a VNF description, and/or a VNFC description in the VNFD.

In another embodiment, the NM/EM provides a direction for target capacity in a VNF scaling request to NFVO/VNFM. In this embodiment, the communication mechanisms (as described above) are used with one exception: the desired target capacity may not be specified at all. Instead, only the direction of the scaling (such as, up/down or expand/contract) is specified in the request.

The scaling levels are specified in the VNFD. The responsibility of VNFM is to scale the resources that are allocated to the VNF, from one pre-defined level to the next level, in the direction specified in the request.

As described above, in the NFV environment, several functional entities (such as a NM, an EM, a NFVO, and/or a VNFM) can initiate the VNF scaling operation (see 3GPP Technical Report 32.842 and ETSI NFV MANO GS). Either the NM or the EM may initiate the scaling operation (such as an expansion or contraction operation). The scaling request may be sent to NFVO/VNFM (via "horizontal" reference points such as Os-Ma-nfvo or Ve-Vnfm, for example). The desired target capacity of the VNF may be indicated in some way so that the NFVONNFM may determine/calculate the amount of target (virtual) resource to allocate to the VNF.

As described above, the NM/EM is generally unaware of the amount of (virtual) resource that corresponds to the target capacity of the VNF. The NM/EM generally only provides an indication of the target capacity in application terms. However, the NFVO/VNFM may need to determine/calculate the amount of target (virtual) resource to the VNF, when executing the scaling operation. If the target capacity is expressed in application terms, the NFVONNFM does not understand the absolute target capacity value that is expressed in application terms. As described above, certain embodiments of the present invention address these technical difficulties.

A conversion mechanism may be needed to convey the desired target capacity (which is expressed in application terms by the NM/EM) to the NFVO/VNFM. After conversion, the desired target capacity is to be conveyed to the NFVONNFM in (virtual) resource terms. As described above, certain embodiments of the present invention address these technical difficulties.

Figure 6:
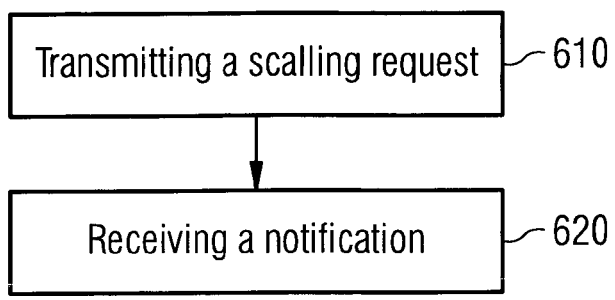
FIG. 6 illustrates a flowchart of a method in accordance with certain embodiments of the invention.

FIG. 6 illustrates a flowchart of a method in accordance with certain embodiments of the invention. The method illustrated in FIG. 6 includes, at 610, transmitting, by a first network node, a scaling request. The scaling request comprises a request for virtualized network function expansion or virtualized network function contraction. The scaling request is transmitted to a second network node. A first domain is directed to application level details. A second domain is directed to virtualization level details, and the scaling request includes: (1) a relative target capacity that is generic to both the first domain and the second domain, (2) an absolute target capacity that is specific to the first domain, or (3) a relative target capacity that is specific to virtualized network function level targets. The method may also include, at 620, receiving a notification that a virtualization network function has been updated based on the transmitted scaling request.

Figure 7:
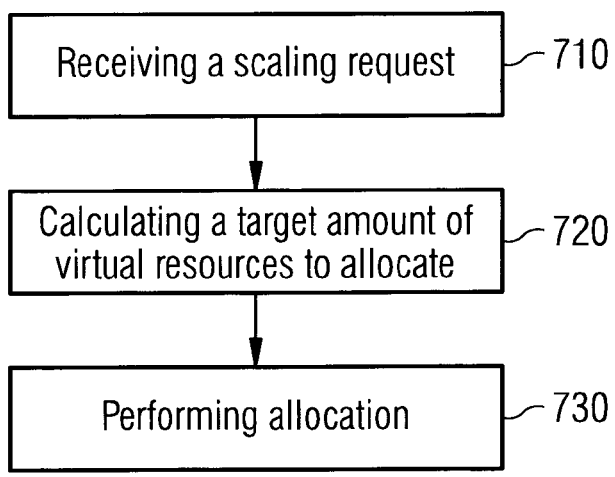
FIG. 7 illustrates a flowchart of a method in accordance with certain embodiments of the invention.

FIG. 7 illustrates a flowchart of a method in accordance with certain embodiments of the invention. The method illustrated in FIG. 7 includes, at 710, receiving, by a second network node, a scaling request. The scaling request comprises a request for virtualized network function expansion or virtualized network function contraction, and the scaling request is received from a first network node. A first domain is directed to application level details, a second domain is directed to virtualization level details, and the scaling request includes: (1) a relative target capacity that is generic to both the first domain and the second domain, (2) an absolute target capacity that is specific to the first domain, or (3) a relative target capacity that is specific to virtualized network function level targets. The method may also include, at 720, calculating a target amount of virtual resources to allocate. The method may also include, at 730, performing allocation of the target amount of virtual resources.

Figure 8:
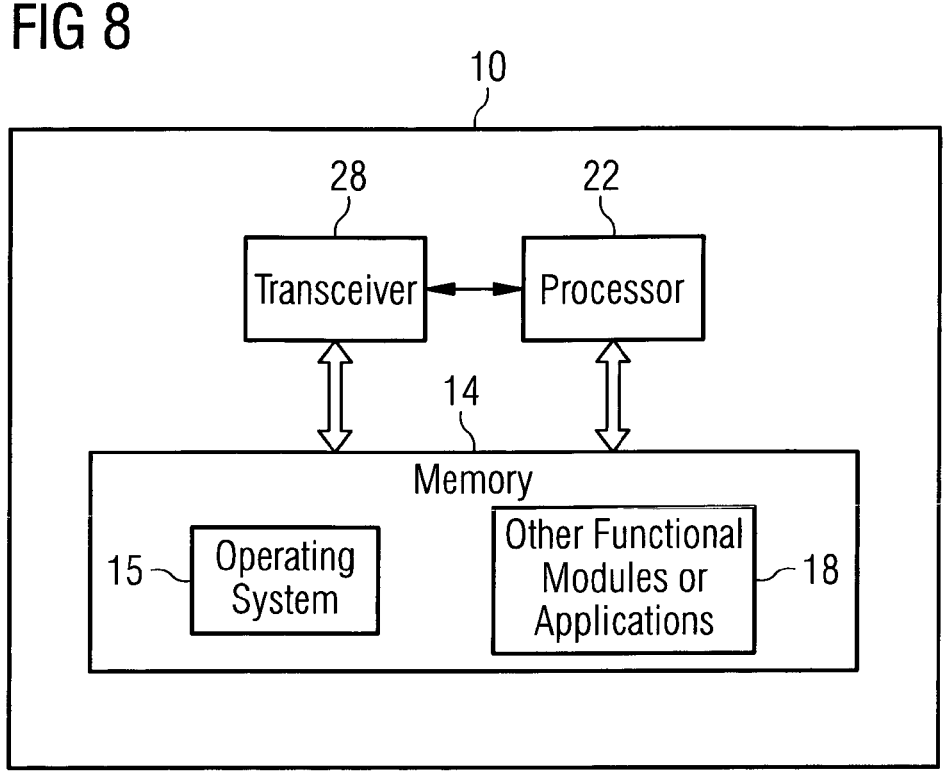
FIG. 8 illustrates an apparatus in accordance with certain embodiments of the invention.

FIG. 8 illustrates an apparatus in accordance with certain embodiments of the invention. In one embodiment, the apparatus can be a network node configured to be an NM, EM, VNF Manager, and/or NFVO, for example. The apparatus can be a network node. Apparatus 10 can include a processor 22 for processing information and executing instructions or operations. Processor 22 can be any type of general or specific purpose processor. While a single processor 22 is shown in FIG. 8, multiple processors can be utilized according to other embodiments. Processor 22 can also include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Apparatus 10 can further include a memory 14, coupled to processor 22, for storing information and instructions that can be executed by processor 22. Memory 14 can be one or more memories and of any type suitable to the local application environment, and can be implemented using any suitable volatile or nonvolatile data storage technology such as a semiconductor-based memory device, a magnetic memory device and system, an optical memory device and system, fixed memory, and removable memory. For example, memory 14 include any combination of random access memory (RAM), read only memory (ROM), static storage such as a magnetic or optical disk, or any other type of non-transitory machine or computer readable media. The instructions stored in memory 14 can include program instructions or computer program code that, when executed by processor 22, enable the apparatus 10 to perform tasks as described herein.

Apparatus 10 can also include one or more antennas (not shown) for transmitting and receiving signals and/or data to and from apparatus 10. Apparatus 10 can further include a transceiver 28 that modulates information on to a carrier waveform for transmission by the antenna(s) and demodulates information received via the antenna(s) for further processing by other elements of apparatus 10. In other embodiments, transceiver 28 can be capable of transmitting and receiving signals or data directly.

Processor 22 can perform functions associated with the operation of apparatus 10 including, without limitation, precoding of antenna gain/phase parameters, encoding and decoding of individual bits forming a communication message, formatting of information, and overall control of the apparatus 10, including processes related to management of communication resources.

In an embodiment, memory 14 can store software modules that provide functionality when executed by processor 22. The modules can include an operating system 15 that provides operating system functionality for apparatus 10. The memory can also store one or more functional modules 18, such as an application or program, to provide additional functionality for apparatus 10. The components of apparatus 10 can be implemented in hardware, or as any suitable combination of hardware and software.

Figure 9:
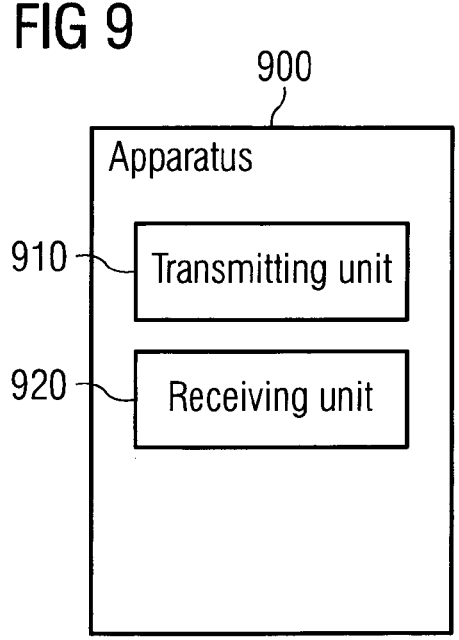
FIG. 9 illustrates an apparatus in accordance with certain embodiments of the invention.

FIG. 9 illustrates an apparatus in accordance with certain embodiments of the invention. Apparatus 900 can be a network element/entity such as a network node that is configured to perform as an EM and/or an NM, for example. Apparatus 900 can include a transmitting unit 910 that transmits a scaling request. The scaling request comprises a request for virtualized network function expansion or virtualized network function contraction. The scaling request is transmitted to a network node. A first domain is directed to application level details, a second domain is directed to virtualization level details. The scaling request includes: (1) a relative target capacity that is generic to both the first domain and the second domain, (2) an absolute target capacity that is specific to the first domain, or (3) a relative target capacity that is specific to virtualized network function level targets. Apparatus 900 may also include a receiving unit 920 that receives a notification that a virtualization network function has been updated based on the received scaling request.

Figure 10:
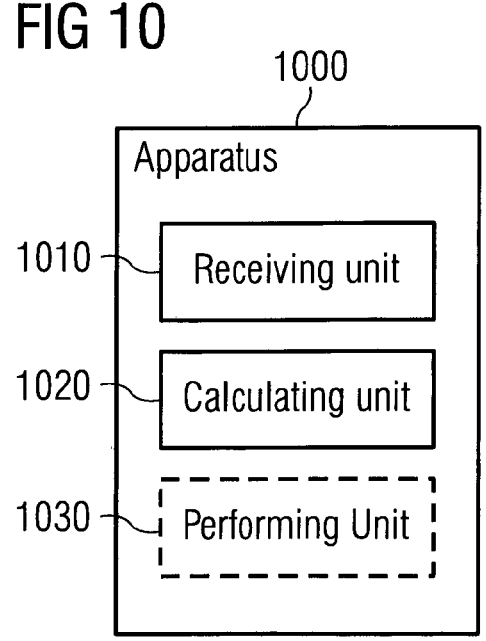
FIG. 10 illustrates an apparatus in accordance with certain embodiments of the invention.

FIG. 10 illustrates an apparatus in accordance with certain embodiments of the invention. Apparatus 1000 can be a network element/entity such as a network node that is configured to perform as a VNF Manager and/or an NFVO, for example, for example. Apparatus 1000 can include a receiving unit 1010 that receives a scaling request. The scaling request comprises a request for virtualized network function expansion or virtualized network function contraction. The scaling request is received from a network node. A first domain is directed to application level details, a second domain is directed to virtualization level details, and the scaling request comprises: (1) a relative target capacity that is generic to both the first domain and the second domain, (2) an absolute target capacity that is specific to the first domain, or (3) a relative target capacity that is specific to virtualized network function level targets. Apparatus 1000 can also include a calculating unit 1020 that calculates a target amount of virtual resources to allocate. Apparatus 1000 may also include a performing unit 1030 that performs allocation of the target amount of virtual resources.

The described features, advantages, and characteristics of the invention can be combined in any suitable manner in one or more embodiments. One skilled in the relevant art will recognize that the invention can be practiced without one or more of the specific features or advantages of a particular embodiment. In other instances, additional features and advantages can be recognized in certain embodiments that may not be present in all embodiments of the invention. One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

We claim:

1. A method, comprising:
transmitting, by a first network node, a scaling request, wherein the scaling request comprises a request for virtualized network function expansion or virtualized network function contraction, the scaling request is transmitted to a second network node, a first domain is directed to application level details, a second domain is directed to virtualization level details, and the scaling request comprises: (1) a relative target capacity that is generic to both the first domain and the second domain, (2) an absolute target capacity that is specific to the first domain, or (3) a relative target capacity that is specific to virtualized network function level targets, wherein the first network node comprises at least one of a network management entity and an element management entity; and
receiving a notification that a virtualization network function has been updated based on the transmitted scaling request.

2. The method according to claim 1, wherein the first network node comprises the network management entity, the network management entity initiates the scaling request, and
if the scaling request comprises a relative target capacity that is generic to both the first domain and the second domain, then the scaling request is transmitted along a first path from the network management entity, to a network functions virtualization orchestrator, to a virtualized network function manager,
if the scaling request comprises an absolute target capacity that is specific to the first domain, then the scaling request is transmitted along a second path towards element management for translating into a relative target capacity, and
if the scaling request comprises a relative target capacity that is specific to virtualized network function level targets, then the scaling request is transmitted along the second path towards the element management for translating into a relative target capacity that is specific to virtualized network function components.

3. The method according to claim 1, wherein the first network node comprises the element management entity, and the second network node comprises at least one of the network functions virtualization orchestrator and the virtualized network function manager.

4. The method according to claim 2, wherein transmitting the scaling request along the second path comprises transmitting the scaling request from the network management entity, to the network functions virtualization orchestrator, to the virtual network function manager, to the element management, and back to the virtual network function manager.

5. The method according to claim 1, wherein the relative target capacity is expressed relative to a current capacity.

6. An apparatus, comprising:
at least one processor; and
at least one memory including computer program code,
the at least one memory and the computer program code configured, with the at least one processor, to cause the apparatus at least to
transmit a scaling request, wherein the scaling request comprises a request for virtualized network function expansion or virtualized network function contraction, the scaling request is transmitted to a network node, a first domain is directed to application level details, a second domain is directed to virtualization level details, and the scaling request comprises: (1) a relative target capacity that is generic to both the first domain and the second domain, (2) an absolute target capacity that is specific to the first domain, or (3) a relative target capacity that is specific to virtualized network function level targets wherein
the apparatus comprises at least one of a network management entity and an element management entity; and
receive a notification that a virtualization network function has been updated based on the transmitted scaling request.

7. The apparatus according to claim 6, wherein the apparatus comprises the network management entity, the network management entity initiates the scaling request, and
if the scaling request comprises a relative target capacity that is generic to both the first domain and the second domain, then the scaling request is transmitted along a first path from the network management entity, to a network functions virtualization orchestrator, to a virtualized network function manager,
if the scaling request comprises an absolute target capacity that is specific to the first domain, then the scaling request is transmitted along a second path towards element management for translating into a relative target capacity, and
if the scaling request comprises a relative target capacity that is specific to virtualized network function level targets, then the scaling request is transmitted along the second path towards the element management for translating into a relative target capacity that is specific to virtualized network function components.

8. The apparatus according to claim 6, wherein the apparatus comprises the element management entity, and the network node comprises at least one of the network functions virtualization orchestrator and the virtualized network function manager.

9. The apparatus according to claim 7, wherein transmitting the scaling request along the second path comprises transmitting the scaling request from the network management entity, to the network functions virtualization orchestrator, to the virtual network function manager, to the element management, and back to the virtual network function manager.

10. The apparatus according to claim 6, wherein the relative target capacity is expressed relative to a current capacity.

11. A computer program product, embodied on a non-transitory computer readable medium, the computer program product configured to control a processor to perform a method according to claim 1.

12. A method, comprising:
receiving, by a second network node, a scaling request, wherein the scaling request comprises a request for virtualized network function expansion or virtualized network function contraction, the scaling request is received from a first network node, a first domain is directed to application level details, a second domain is directed to virtualization level details, and the scaling request comprises: (1) a relative target capacity that is generic to both the first domain and the second domain, (2) an absolute target capacity that is specific to the first domain, or (3) a relative target capacity that is specific to virtualized network function level targets, wherein
the first network node comprises at least one of a network management entity and an element management entity;
calculating a target amount of virtual resources to allocate; and
performing allocation of the target amount of virtual resources.

13. The method according to claim 12, wherein the second network node comprises a network functions virtualization orchestrator.

14. The method according to claim 12, wherein the second network node comprises a virtualized network function manager.

15. The method according to claim 12, wherein the relative target capacity is expressed relative to a current capacity.

16. An apparatus, comprising:
at least one processor; and
at least one memory including computer program code,
the at least one memory and the computer program code configured, with the at least one processor, to cause the apparatus at least to
receive a scaling request, wherein the scaling request comprises a request for virtualized network function expansion or virtualized network function contraction, the scaling request is received from a network node, a first domain is directed to application level details, a second domain is directed to virtualization level details, and the scaling request comprises: (1) a relative target capacity that is generic to both the first domain and the second domain, (2) an absolute target capacity that is specific to the first domain, or (3) a relative target capacity that is specific to virtualized network function level targets, wherein
the network node comprises at least one of a network management entity and an element management entity;
calculate a target amount of virtual resources to allocate; and
perform allocation of the target amount of virtual resources.

17. The apparatus according to claim 16, wherein the apparatus comprises a network functions virtualization orchestrator.

18. The apparatus according to claim 16, wherein the apparatus comprises a virtualized network function manager.

19. The apparatus according to claim 16, wherein the relative target capacity is expressed relative to a current capacity.

20. A computer program product, embodied on a non-transitory computer readable medium, the computer program product configured to control a processor to perform a method according to claim 12.

* * * * *